United States Patent [19]

Minakuchi

[11] 4,149,116
[45] Apr. 10, 1979

[54] MOTOR SPEED CONTROL SYSTEM

[75] Inventor: Hiroshi Minakuchi, Shiga, Japan

[73] Assignee: Matsushita Electric Industrial Co., Ltd., Osaka, Japan

[21] Appl. No.: 808,289

[22] Filed: Jun. 20, 1977

[30] Foreign Application Priority Data

Jun. 23, 1976 [JP] Japan .................................. 51-74787
Aug. 31, 1976 [JP] Japan ................................ 51-104794
Sep. 14, 1976 [JP] Japan ................................ 51-110301

[51] Int. Cl.$^2$ ............................................. H02P 5/00
[52] U.S. Cl. ..................................... 318/341; 318/317; 318/318; 318/336
[58] Field of Search ............... 318/317, 318, 328, 336, 318/341, 342, 345 B, 398, 410, 271

[56] References Cited

U.S. PATENT DOCUMENTS

| | | | |
|---|---|---|---|
| 3,223,912 | 12/1965 | Sheheen | 318/341 |
| 3,275,926 | 9/1966 | Sheheen | 318/341 |
| 3,356,921 | 12/1967 | Bradford et al. | 318/341 |
| 3,559,008 | 1/1971 | Stut et al. | 318/341 |

Primary Examiner—Robert K. Schaefer
Assistant Examiner—M. K. Mutter
Attorney, Agent, or Firm—Stevens, Davis, Miller & Mosher

[57] ABSTRACT

A motor speed control system detects a rotation speed of a motor, compares a detected output signal with a reference voltage or a reference frequency to produce an error signal, produces a saw-tooth wave signal of an appropriate repetition frequency, compares the error signal with the saw-tooth wave signal to produce a switching signal, and drives a motor by the switching signal to control the speed of the motor. The system includes a first driver circuit for driving the motor by the output signal of a first comparator circuit which produces the error signal, and a second driver circuit for driving the motor by the output signal of a second comparator circuit which produces the switching signal. The motor is normally driven by the second driver circuit for speed control and is driven by the first driver circuit when the motor is started or overloaded or when the second driver circuit is defective.

2 Claims, 17 Drawing Figures

MOTOR SPEED CONTROL SYSTEM

FIELD OF THE INVENTION

The present invention relates to a motor speed control system which has a high control gain and a high efficiency.

DESCRIPTION OF THE PRIOR ART

Figure 1:
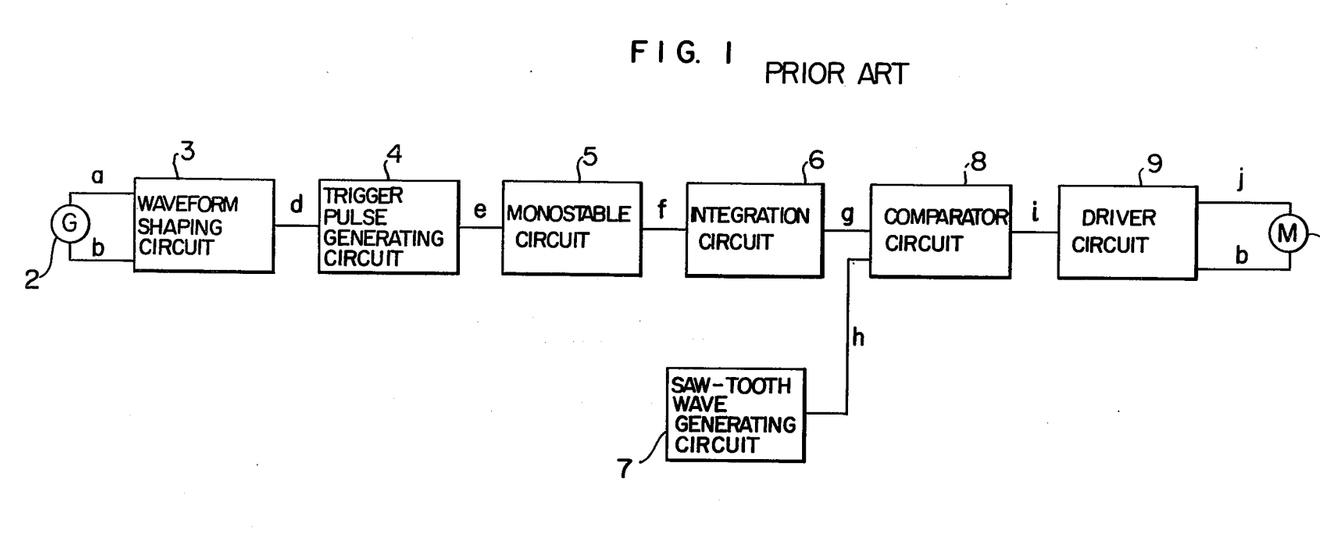
FIG. 1 is a block diagram showing one example of a prior art motor speed control system.

Referring to FIG. 1, a block diagram of a circuit configuration of a motor speed control system which has been commonly used in the past is shown and particular circuits thereof are shown in FIGS. 2 to 8.

In FIG. 1, an output of an AC generator 2 coupled to a motor 1 is applied to a waveform shaping circuit 3 where it is reshaped to a square waveform, which in turn is applied to a trigger pulse generating circuit 4. The square waveform is thereby transformed to an impulse trigger pulse which drives a monostable circuit 5 in the succeeding stage.

An output square waveform of the monostable circuit 5 has a constant duration and a repetition frequency which is identical to an output frequency of the AC generator 2, which in turn depends on a rotation speed of the motor 1. Thus, by applying the output square waveform of the monostable circuit 5 to an integration circuit 6 in the succeeding stage, a D.C. voltage which changes with the rotation speed of the motor 1 is derived. In FIG. 1, the blocks 3 to 6 including the AC generator 2 constitute a rotation speed detector. (Block 7, 8 and 9 will be described later.)

Figure 2:
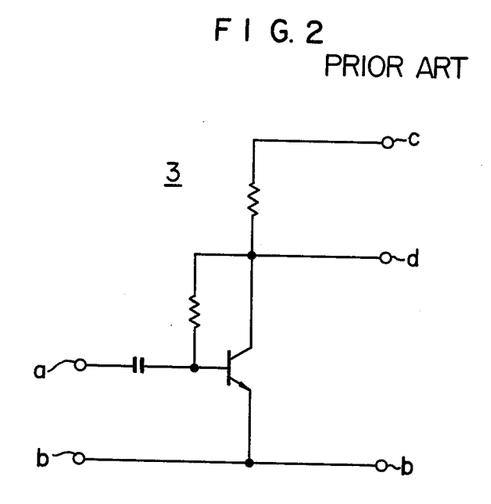
FIG. 2 shows an example of a waveform shaping circuit shown in FIG. 1.

FIG. 2 shows a particular embodiment of the waveform shaping circuit 3. The AC generator 2 is connected across input terminals a and b and a square waveform having an amplitude which is substantially equal to a supply voltage between supply terminals c and b and a repetition frequency which is equal to the output frequency of the AC generator 2 is produced at the output terminal d.

Figure 3:
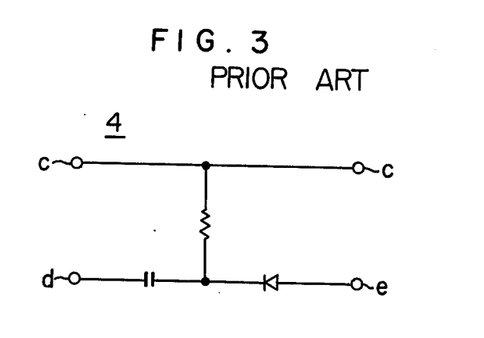
FIG. 3 shows an example of a trigger pulse generating circuit shown in FIG. 1.

FIG. 3 shows a particular embodiment of the trigger pulse generating circuit 4 which comprises a combination of a differentiating circuit having a circuitry and a resistor and a rectifying circuit having a diode. When a load resistor is connected across terminals e and c a negative-going pulse train having a repetition frequency of the input square waveform is derived.

The terminals c and d in FIG. 3 are connected to the terminals c and d in FIG. 2. Hereinafter, the terminals designated by the same reference character are interconnected.

Figure 4:
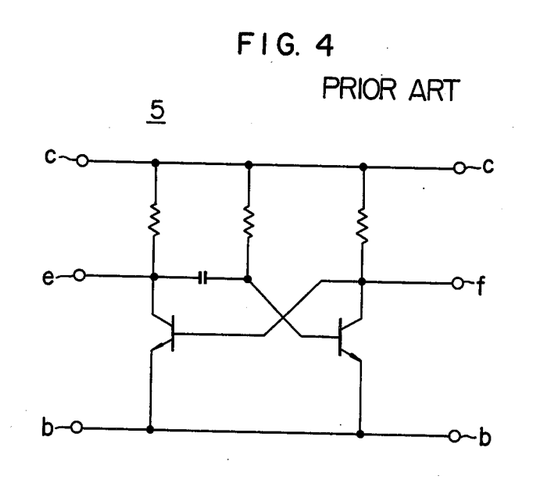
FIG. 4 shows an example of a monostable multivibrator shown in FIG. 1.

FIG. 4 shows a particular embodiment of the monostable circuit 5, and it is a commonly known monostable multivibrator circuit. A potential at an output terminal f is normally at substantially zero level and rises to a potential at the supply terminal c for a predetermined time interval whenever a negative-going trigger pulse is applied to an input terminal e.

Figure 5:
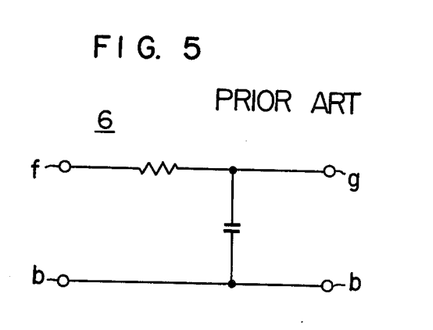
FIG. 5 shows an example of an integration circuit shown in FIG. 1.

FIG. 5 shows a particular embodiment of the integration circuit 6 which is composed of a resistor and a capacitor. By interconnecting the waveform shaping circuit of FIG. 2 through the integration circuit of FIG. 5 as well as the AC generator 2, a D.C. voltage which rises with the increase of the rotation speed of the motor 1 is derived across terminals g and b.

Referring again to FIG. 1, the output voltage of the integration circuit 6 is applied to a comparator circuit 8 together with an output signal of a saw-tooth wave generating circuit 7 which produces a saw-tooth wave having an appropriate repetition frequency.

An output signal of the comparator circuit 8 is applied to a driver circuit 9 which drives the motor 1.

Figure 6:
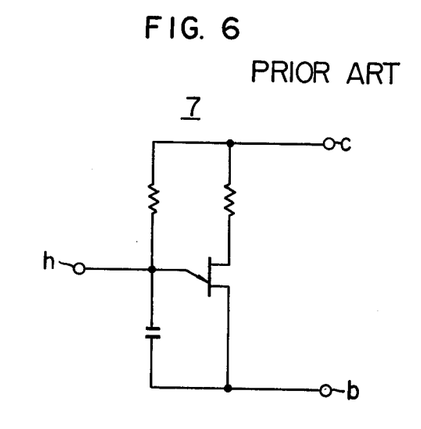
FIG. 6 shows an example of a saw-tooth wave generating circuit shown in FIG. 1.

FIG. 6 shows a particular embodiment of the saw-tooth wave generating circuit 7 which comprises a relaxiation oscillation circuit having a uni-junction transistor, resistors and a capacitor. The output saw-tooth wave is derived from an emitter of the uni-junction transistor.

Figure 7:
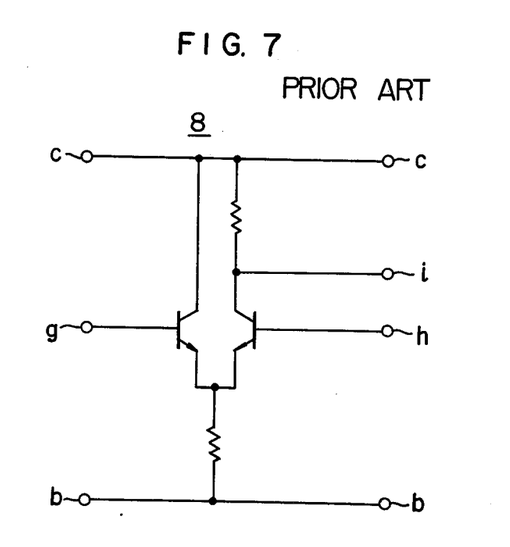
FIG. 7 shows an example of a comparator circuit shown in FIG. 1.

FIG. 7 shows an example of the comparator circuit 8 which employs a differential amplifier. When the output voltage of the integration circuit of FIG. 5 and the output signal of the saw-tooth wave generating circuit of FIG. 6 are applied to compare input terminals g and h, respectively, an output transistor conducts only during a time period in which the potential of the saw-tooth wave is higher than the output voltage of the integration circuit.

Figure 8:
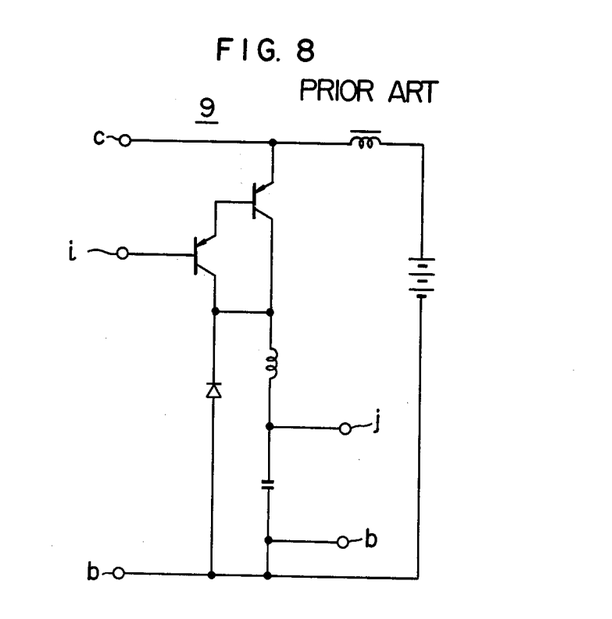
FIG. 8 shows an example of a driver circuit shown in FIG. 1.

FIG. 8 shows a particular embodiment of the drive circuit 9, which comprises a pair of Darlington connected PNP transistors, a reversely poled idling diode, a choke coil inserted in series with the D.C. motor to be connected across terminals j and b, a filtering capacitor connected in parallel to the D.C. motor, a D.C. power supply and a filtering choke coil connected in series with the D.C. power supply.

Figure 9:
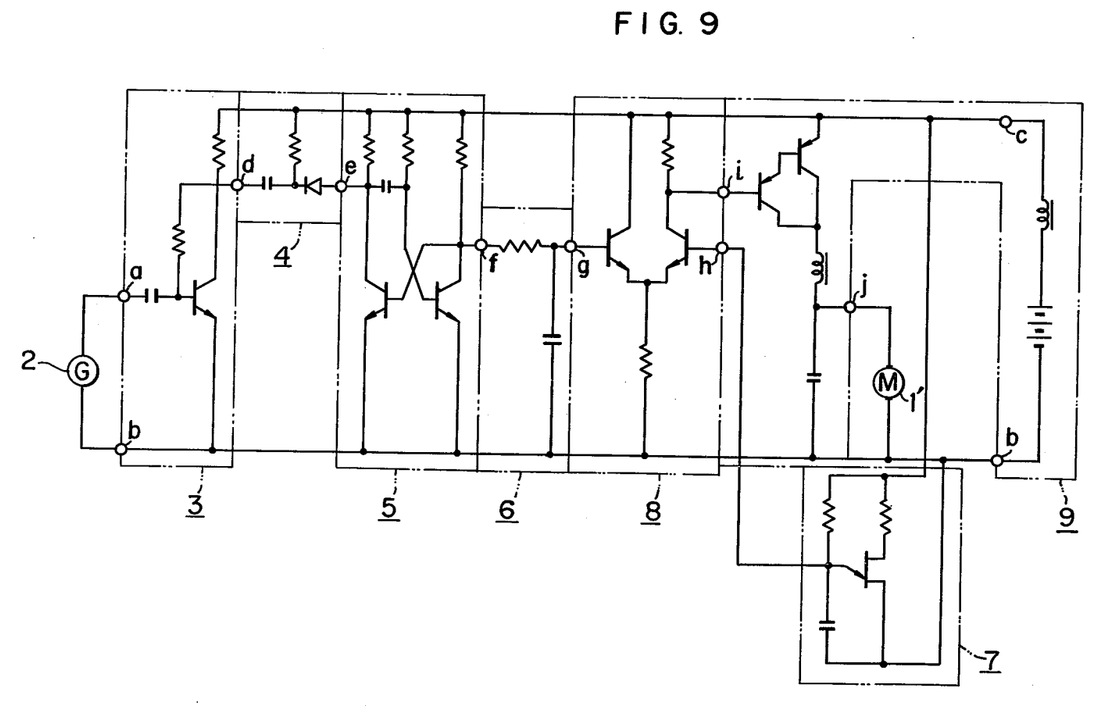
FIG. 9 shows a circuit diagram which combines the embodiment shown in FIG. 2 to 8.

FIG. 9 shows an overall circuit diagram which interconnects the embodiments shown in FIGS. 2 to 8. As seen from FIG. 9, by connecting the input terminal i of the driver circuit 9 to the output terminal i of the comparator circuit 8, the D.C. motor 1' connected between the output terminals j and b of the driver circuit 9 is controlled to a constant rotation speed through a highly efficient switching control.

More particularly, if the rotation speed of the D.C. motor 1' increases by some reason or other, the output voltage of the integration circuit 6 rises and the conduction period of the output transistor of the comparator circuit 8 is reduced. As a result, the feed period to the D.C. motor 1' in the switching cycle is reduced and the rotation speed of the D.C. motor 1' is reduced.

If the rotation speed of the D.C. motor 1' decreases, the inverse procedure occurs such that the D.C. motor 1' is controlled to increase the rotation speed thereof.

In this manner, in the system shown in FIG. 1 or FIG. 9, the motor is controlled to be rotated at a preset rotation speed irrespective of the change in the load of the motor.

While the prior art system shown in FIGS. 1 through 9 has an advantage of very high efficiency because the power supplied to the motor is controlled by the on-off or switching of the power supplied to the motor, it also has a drawback of a large control error because the output signal of the comparator circuit 8 is not a D.C. voltage of a constant level but a square wave signal and hence a high control gain is not attained between the comparator circuit 8 and the motor 1.

Furthermore, it has a disadvantage that when the operation of the saw-tooth wave generating circuit 7 stops or the signal frequency changes, they appear as a change in the rotation speed of the motor.

In addition to the above U.S. Pat. No. 3,624,474 shows another example which realizes a system of this type with a relatively simple construction. However, since this system detects a counter-electromotive force of a D.C. motor to derive a D.C. voltage which depends on the rotation speed of the D.C. motor, it has problems in that a change in a contact resistance between a brush and a commutator affects the rotation speed and the rotation speed of the D.C. motor changes when an oscillation frequency of a switching carrier oscillator changes.

SUMMARY OF THE INVENTION

The motor speed control system of the present invention overcomes the above problems.

It is a first object of the present invention to provide a motor speed control system which has a high control gain and a high efficiency.

It is another object of the present invention to provide a highly reliable motor speed control system.

DESCRIPTION OF THE PREFERRED EMBODIMENTS

Figure 10:
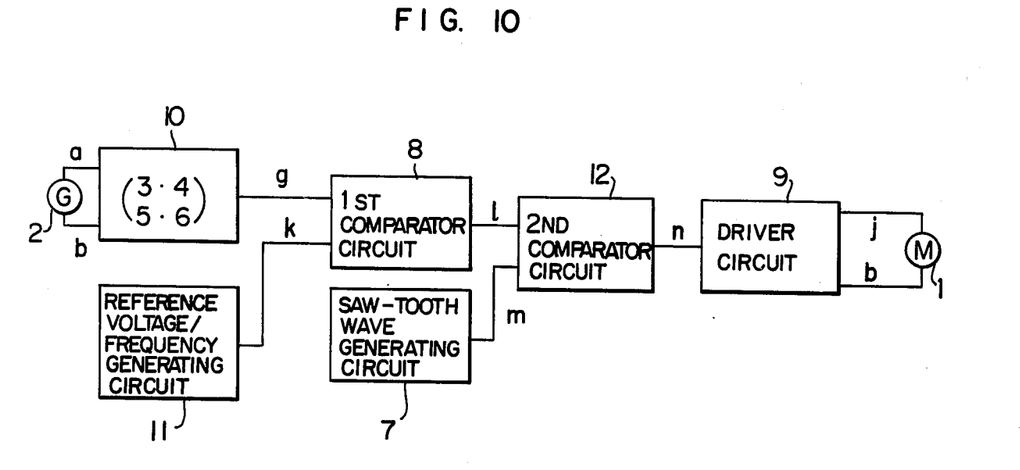
FIG. 10 is a block diagram illustrating one embodiment of a motor speed control system of the present invention.

Referring to FIG. 10, a block diagram of one embodiment of the present system is shown. In FIG. 10, like blocks and terminals to those shown in FIG. 1 are designated by the same reference characters.

In FIG. 10, a block 10 to which the AC generator 2 is connected is the combination of the waveform shaping circuit 3, the trigger pulse generating circuit 4, the monostable circuit 5 and the integration circuit 6, as shown in FIG. 1 and having circuits exemplified by FIGS. 2 to 5. Only a single block 10 is shown for drawing simplification.

A block 11 in FIG. 10 is a reference voltage or reference frequency generating circuit. A particular embodiment of the reference voltage generating circuit is shown in FIG. 11.

Figure 11:
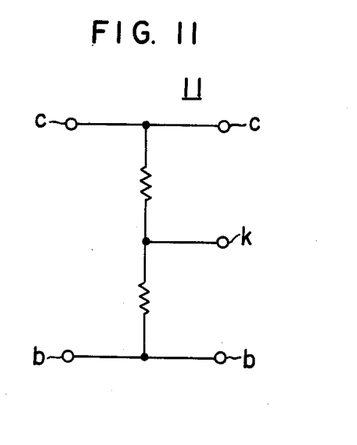
FIG. 11 shows an embodiment of a reference voltage generating circuit shown in FIG. 10.

In FIG. 11, the D.C. voltage across the supply terminals c and d is divided by two resistors to produce a reference voltage at a terminal k.

When the reference frequency generating circuit is used, it is generally composed of an oscillation circuit using a crystal resonator and a frequency dividing circuit for counting down the oscillation frequency of the oscillation circuit to the frequency generated by the AC generator 2.

When the block 11 is composed of the reference frequency generating circuit, the block 10 comprises only the waveform shaping circuit and a frequency difference or a phase difference of the block 10 and the block 11 is derived as an error signal by a frequency comparator circuit or a phase comparator circuit in the succeeding stage.

In FIG. 10, the first comparator circuit 8 to which the outputs of the blocks 10 and 11 are applied may be a voltage comparator circuit, a frequency comparator circuit or a phase comparator circuit depending on the type of physical quantities to be compared. When the voltage comparator circuit is used, a particular embodiment thereof may be that shown in FIG. 7 like in the case of FIG. 1. Although the input terminals in FIG. 7 are designated as g and h, the terminal h in FIG. 7 is substituted by the terminal k in FIG. 10.

Figure 12:
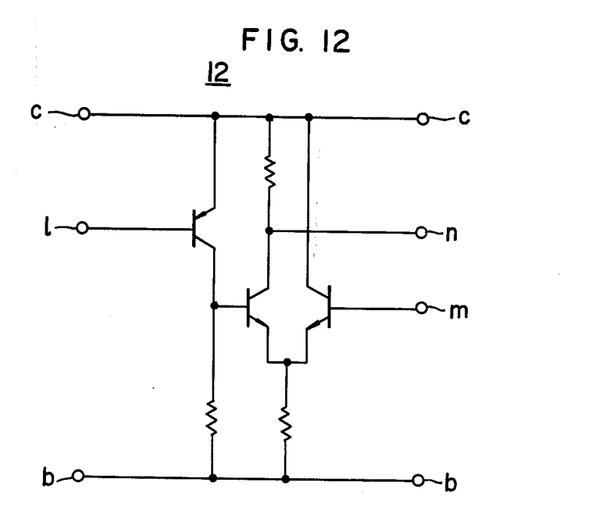
FIG. 12 shows an embodiment of a comparator circuit shown in FIG. 10.

The output signals of the first comparator circuit 8 and the saw-tooth wave generating circuit 7 are applied to input terminals l and m, respectively, of a second comparator circuit 12. A particular embodiment of the saw-tooth wave generating circuit 7 may be that shown in FIG. 6 like in the case of FIG. 1, and a particular embodiment of the second comparator circuit 12 is shown in FIG. 12. When the saw-tooth wave generating circuit shown in FIG. 6 is used as the block 7 in FIG. 10, the output terminal h in FIG. 6 is substituted by the terminal m.

The particular embodiment of the second comparator circuit 12 shown in FIG. 12 is basically identical to the embodiment of the comparator circuit shown in FIG. 7 except that the l terminal of the input terminals in phase inverted by a PNP transistor and a terminal n as the output terminal is connected to that one of the pair of NPN transistor forming the differential amplifier which is connected to the inverting PNP transistor.

The output signal of the second comparator circuit 12 is applied to the driver circuit 9, a particular embodiment of which is exemplified by the driver circuit of FIG. 8 with the input terminal i being substituted by the terminal n.

The construction of the motor speed control system described above is summarized as follows.

The system comprises a detector (including the AC generator 2 and the block 10) for detecting the rotation speed of the motor 1, the first comparator circuit 8 for comparing the output signal of the detector with the reference voltage or reference frequency derived from the reference signal generating circuit 11 to produce the error signal, the signal generating circuit 7 for generating the saw-tooth wave of the appropriate repetition frequency, the second comparator circuit 12 for comparing the error signal with the saw-tooth wave to produce the switching signal, and the driver circuit 9 for driving the motor 1 in response to the switching signal.

Figure 13:
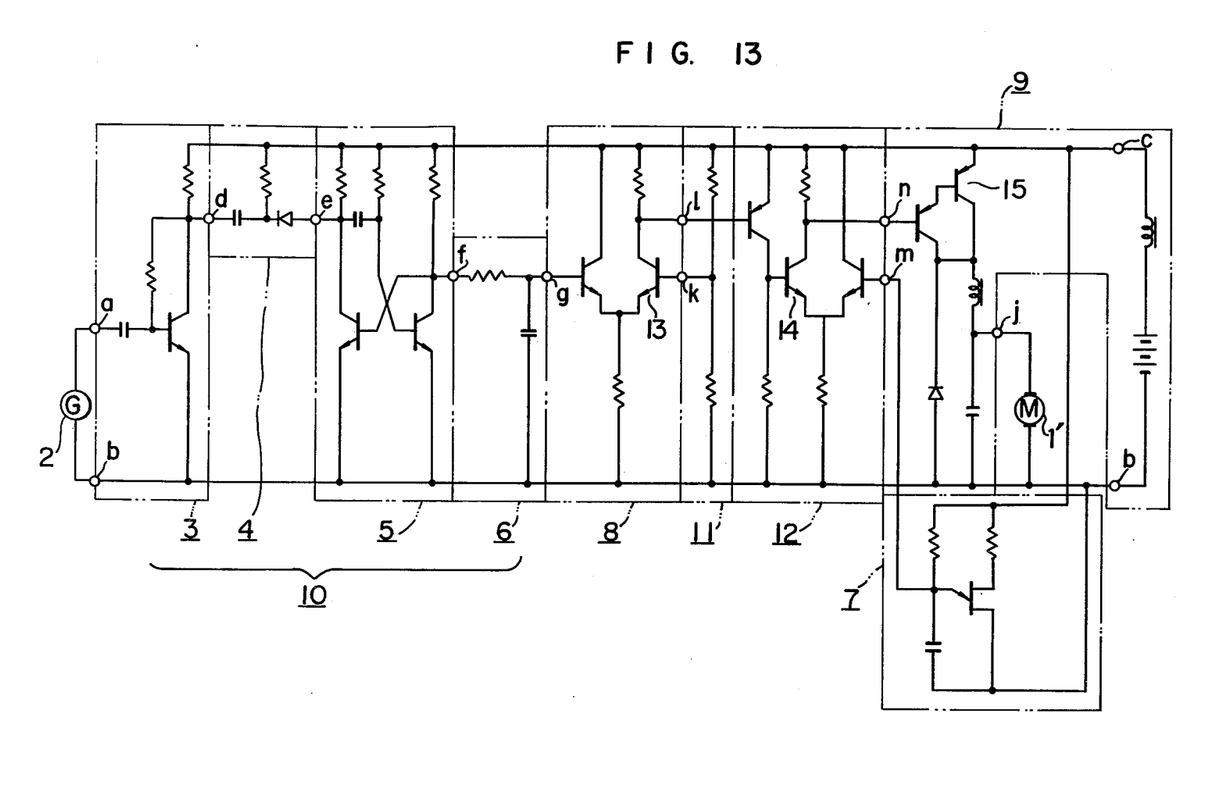
FIG. 13 shows an overall circuit diagram illustrating a particular embodiment of FIG. 10.

FIG. 13 shows a particular embodiment of FIG. 10 in which the blocks shown in FIG. 10 are implemented by the circuits shown in FIGS. 2, 3, 4, 5, 6, 7, 8, 10 and 11. The operation of the circuit of FIG. 13 is now explained. A D.C. voltage corresponding to the rotation speed of the D.C. motor 1' is derived at the output of the integration circuit 6 and this voltage is compared with the reference voltage by the first comparator circuit 8. A output transistor 13 of the first comparator circuit 8 is in an active region only when the output voltage of the integration circuit 6 in the preceding stage coincides with the reference voltage, and the transistor 13 is in a cut-off region or a saturation region in all other cases.

The output transistor 13 of the first comparator circuit 8 is in the cut-off region when the output voltage of the integration circuit 6 exceeds the reference voltage, that is, when the rotation speed of the D.C. motor 1' is higher than a preset rotation speed. Since no current flows in the output transistor 14 of the second comparator circuit 12 at this time, the driver transistor is also cut off and the rotation speed of the D.C. motor 1' is lowered.

On the other hand, the output transistor 13 of the first comparator circuit 8 is in the saturation region when the output voltage of the integration circuit 6 falls below the reference voltage, that is, when the rotation speed of the D.C. motor 1' is lower than the preset rotation speed. At this time, the output transistor 14 of the second comparator circuit 12 is also saturated and the driver transistor 15 is also saturated. As a result, the rotation speed of the D.C. motor 1' increases.

In an intermediate state, that is, when the rotation speed of the D.C. motor 1' is maintained at the predetermined speed, in other words, when the constant speed control is being attained, the output transistor 13 of the first comparator circuit 8 is in the active region and the output current thereof increases or decrease depending on the load to the D.C. motor 1'.

As a result, the base potential of the output transistor 14 of the second comparator circuit 12 changes in accordance with the output current of the output transistor 13 of the first comparator circuit 8, and the conduction period of the output transistor 14 of the second comparator circuit 12 in the repetition cycle of the output signal of the saw-tooth wave generating circuit 7 is lengthened or shortened depending on the change of the base potential of the output transistor 14 of the second comparator circuit.

For example, when the load to the D.C. motor 1' increases, the base potential of the transistor 14 of the second comparator circuit 12 rises and hence the conduction period is lengthened.

As a result, the feed period to the D.C. motor 1' by the driver transistor 15 is extended so that higher power is applied to the D.C. motor 1'.

It is apparent from the above description that since the motor speed control system of the present invention operates such that the output signal of the block 10 or the blocks 3, 4, 5 and 6 eventually coincides with the output signal of the block 11, that is, the two input signals to the first comparator circuit 8 coincide with each other, the presence of the saw-tooth wave generating circuit 7 is insignificant except that it switch-controls the power fed to the motor 1 to attain a high control efficiency.

In an extreme case, in the prior system shown in FIG. 1, the rotation speed of the motor 1 changes considerably when the operation of the saw-tooth wave generating circuit 7 stops. In the present system shown in FIG. 10, when the operation of the saw-tooth wave generating circuit 7 stops, the control mode is automatically changed from the switching control to the continuous control and the system still controls in such a manner that the two input signals to the first comparator circuit 8 coincide with each other. Accordingly, the rotation speed of the motor 1 does not change.

In the system shown in FIG. 1, since the output signal of the block 6 is compared with the saw-tooth wave to produce a compared output in the form of the square wave, it is necessary to increase the detection gain of the detector, that is, the conversion gain of the rotation speed to D.C. voltage or to reduce the output amplitude of the saw-tooth wave to increase the compare gain, in order to increase the control gain of the control system. It is apparent that these methods increase the instability factor of the control system. On the other hand, in the present system shown in FIG. 10, since the output signal of the first comparator circuit 8 is a D.C. signal, the control gain can be simply increased by increasing the D.C. gain.

Figure 14:
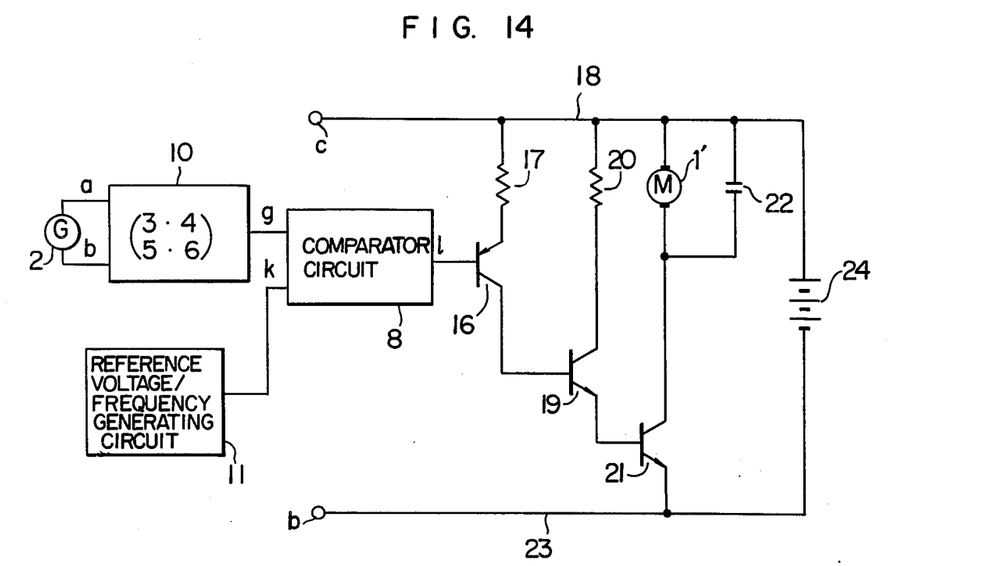
FIG. 14 shows a circuit diagram illustrating another example of the prior art system.

Now, lets consider a case where the present invention is applied to a prior art continuous speed control system for a D.C. motor, such as shown in FIG. 14.

In FIG. 14, the saw-tooth wave generating circuit 7, the second comparator circuit 12 and the drive circuit 9 shown in the system of FIG. 10 have been removed and a continuous control driver circuit is connected to the output of the first comparator circuit 8. Thus, FIG. 14 shows a construction of one of the most common systems employing a continuous control mode.

A base of a PNP transistor 16 is connected to the output terminal 1 of the comparator circuit 8, and an emitter of the transistor 16 is connected to a positive supply line 18 through a resistor 17 while a collector thereof is connected to a base of an NPN transistor 19.

A collector of the transistor 19 is connected to the positive supply line 18 through a resistor 20 while an emitter thereof is connected to a base of the transistor 21.

The D.C. motor 1' is connected between a collector of the transistor 21 and the positive supply line 18, and a capacitor 22 is connected in parallel with the D.C. motor 1'.

An emitter of the transistor 21 is connected to a negative supply line 23, and a D.C. power supply 24 is connected across the positive supply line 18 and the negative supply line 23.

Figure 15:
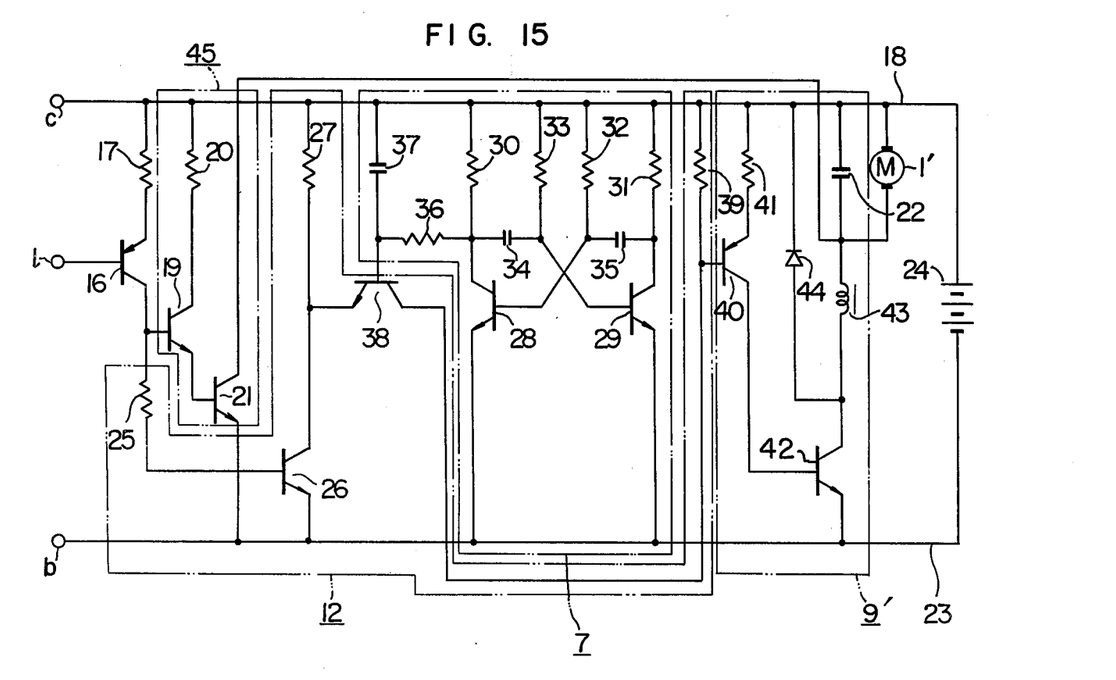
FIGS. 15, 16 and 17 ae circuit diagrams illustrating other embodiments of the present invention.

FIG. 15 illustrates an embodiment wherein the present invention is applied to the 15, motor speed control system described above.

In FIG. 15, connected to the output terminal 1 of the first comparator circuit 8 (shown in FIG. 14) is the driver circuit comprising the transistor 16, resistor 17, transistor 19, resistor 20 and transistor 21 (first drive transistor), and base-emitter of a transistor 26 (first stage transistor forming a second driver circuitry) is connected across the collector of the transistor 16 and the negative supply line through a resistor 25, while a collector of the transistor 26 is connected to the positive supply line 18 through a resistor 27.

Connected across the positive supply line 18 and the negative supply line 23 is a well-known astable multivibrator comprising transistors 28 and 29, resistors 30, 31, 32 and 33 and capacitor 34 and 35, and an integration circuit composed of a resistor 36. capacitor 37 for converting an output square wave of the astable multivibrator to a saw-tooth wave is connected between a collector of the transistor 28 and the positive supply line 18.

A base of the transistor 38 is connected to an output of the integration circuit, and an emitter of the transistor 38 is connected to the collector of the transistor 26 while a collector of the transistor 38 is connected to the positive supply line 18 through a resistor 39.

A base of a transistor 40 (second drive transistor) is connected to the collector of the transistor 38 while an emitter of the transistor 40 is connected to the positive supply line 18 through a resistor 41 and a collector thereof is connected to a base of a transistor 42.

An emitter of the transistor 42 is connected to the negative supply line 23 and to one of the supply terminals of the D.C. motor 1' through a choke coil 43.

The other supply terminal of the D.C. motor 1' is connected to the positive supply line 18 and to the capacitor 22 in parallel with the D.C. motor 1'.

A diode 44 is connected between a collector of the transistor 42 and the positive supply line 18.

The terminals c and b represent positive and negative supply terminals, respectively, for feeding the blocks 10, 11 and 8.

In FIG. 15, the first comparator circuit is constituted by the block 8, not shown in FIG. 15, the transistor 16 and the resistor 17, the first driver circuit 45 is constituted by the transistor 19, the resistor 20 and the transistor 21. the second comparator circuit 12 is constituted by the resistor 25, the transistor 26, the resistor 27, the transistor 38 and the resistor 39, and the second driver circuit 9' is constituted by the transistor 40, the resistor 41, the transistor 42, the choke coil 43 and the diode 44.

It is apparent from a comparison of FIG. 14 with FIG. 15 that the present invention can attain its intended object by merely adding the second comparator circuit and the second driver circuit to the prior art motor speed control system of continuous control mode without other modifications.

In FIG. 15, when normal speed control is being carried out, the collector current of the transistor 16 is fairly small. Accordingly, by properly selecting the resistance of the resistor 25, the circuit can be designed such that all of the collector current flows into the base of the transistor 26.

Under such a condition, the first driver circuitry is blocked and the D.C. motor 1' is switch-controlled only by the second driver circuitry including the second comparator circuit (i.e. second driver circuit, saw-tooth wave generating circuit and second comparator circuit).

On the other hand, when the D.C. motor 1' is overloaded or when it starts up the voltage drop across the choke coil 43 is not negligible. Under this condition, since the rotation speed of the D.C. motor 1' is below a predetermined rotation speed, the transistor 16 saturates and its collector current increases abruptly.

As the collector current of the transistor 16 significantly increases to the point where the voltage drop across the resistor 25 exceeds the base-emitter forward voltage of the transistor 21, the first driver circuitry operates so that the D.C. motor 1' is mainly fed from the transistor 21. As a result, no problem occurs even if the D.C. resistance of the choke coil 43 is high.

Furthermore, even if the second comparator circuit, the second driver circuit or the saw-tooth wave generating circuit fail so that there is no feeding by the second driver transistor 42, the rotation speed of the D.C. motor 1' is maintained constant because the feeding of the continuous control mode is maintained by the first driver transistor 21.

While the base of the first driver transistor 21 is connected to the collector of the transistor 16 through the base-emitter of the transistor 19 in the circuit of FIG. 5, a similar effect may be obtained when a voltage drop element such as a diode is connected instead of the base-emitter of the transistor 19.

Figure 16:
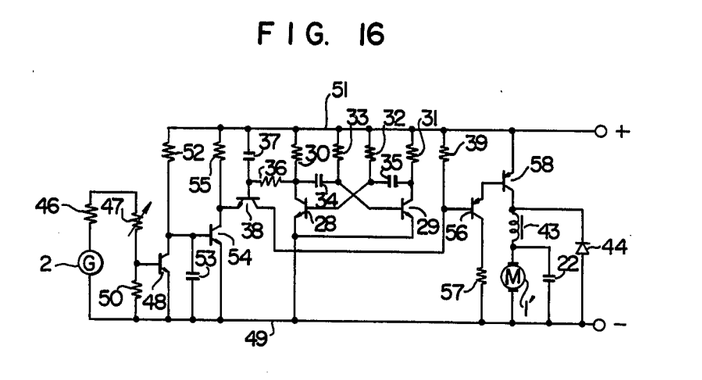

FIG. 16 shows a circuit diagram of another embodiment of the D.C. motor speed control system of the present invention.

In FIG. 16, one of the output terminals of the A.C. generator 2 which is contained in the D.C. motor 1' or linked thereto and produces an A.C. signal of a frequency which varies with the rotation speed of the D.C. motor 1' is connected to a switching transistor 48 through a resistor 46 and a potentiometer 47, and the other output terminal of the A.C. generator 2 is connected to a negative supply line 49. An emitter of the switching transistor 48 is also connected to the negative supply line 49 and a resistor 50 is connected across base and emitter of the switching transistor 48.

A series circuit of a resistor 52 and a capacitor 53 is connected across a positive supply line 51 and the negative supply line 49, and a collector of the switching transistor 48 and a base of a D.C. amplifying transistor 54 are connected to the junction of the resistor 52 and the capacitor 53. An emitter of the D.C. amplifying transistor 54 is connected to the negative supply line 49 while a collector thereof is connected to the positive supply line 51 through a resistor 55.

An astable multivibrator comprising transistors 28 and 29, resistors 30, 31, 32 and 33 and capacitors 34 and 35 is connected across the positive supply line 51 and the negative supply line 49, and a series circuit of a resistor 36 and a capacitor 37 is connected between a collector of the transistor 28 and the positive supply line 51. A base of the transistor 38 is connected to the junction of the resistor 36 and the capacitor 37.

Connected to the collector of the D.C. amplifying transistor 54 is an emitter of the transistor 38, and a collector thereof is connected to the positive supply line 51 through a resistor 39 and to a base of a transistor 56, a collector of which is connected to the negative supply line 49 through a resistor 57 while an emitter thereof is connected to a base of a driver transistor 58, an emitter of which is connected to the positive supply line 51.

On the other hand, a collector of the driver transistor 58 is connected to one of the supply terminals of the D.C. motor 1' and an idling diode 44 is connected between the collector of the driver transistor 58 and the negative supply line 49.

The other supply terminal of the D.C. motor 1' is connected to the minus supply line 49 and a capacitor 22 is connected across the supply terminals of the D.C. motor 1'.

In FIG. 16, a series circuit of a resistor 52 and a capacitor 53 connected between the collector of the switching transistor 48 and the supply line constitutes a filtering circuit for filtering a switching signal appearing at the output of the switching transistor 48 to thus convert it to a D.C. signal, and the transistors 28 and 29, the resistors 30, 31, 32 and 33, the capacitors 34 and 35, the resistor 36 and the capacitor 37 constitute a saw-tooth wave generating circuit which produces a saw-tooth wave of a repetition period which is shorter than the switching period of the switching transistor, that is, the repetition period of the output signal of the A.C. generator 2. The D.C. amplifying transistor 54 and the resistor 55 constitute a D.C. amplifier circuit, and the transistor 38 constitutes a comparator switching circuit which compares the signal voltage derived by amplifying the output voltage of the filtering circuit with the saw-tooth wave which is the output signal of the saw-tooth wave generating circuit.

The A.C. generator 2 produces an A.C. sinusoidal wave having an amplitude and a frequency which are dependent on the rotation speed of the D.C. motor 1'. The A.C. sinusoidal wave output signal is applied to the switching transistor 48 through the resistor 46 and the potentiometer 47, and when the base voltage thereof exceeds a base-emitter forward rising voltage of the switching transistor 48, the switching transistor 48 is turned on so that the charge stored in the capacitor is discharged.

The faster the rotation speed of the D.C. motor 1' the larger is the amplitude of the output signal of the A.C. generator 2, the larger is a ratio of on-period to off-period of the switching transistor 48 and the smaller is the average D.C. voltage stored in the capacitor 53.

Furthermore, even if the output amplitude of the A.C. generator 2 is constant independently of the change of the rotation speed of the D.C. motor 1', (for example, in case of a photo-electric detection type A.C. generator), the switching period of the switching transistor 48 is shortened when the rotation speed of the D.C. motor 1' increases to increase the output signal frequency of the A.C. generator 2. As a result, the average D.C. voltage stored in the capacitor 53 is reduced.

When a magnet type A.C. generator, which is presently most commonly used is used as the A.C. generator 2, the average D.C. voltage stored in the capacitor 53 is affected by both the output amplitude and output frequency of the A.C. generator 2 and the rotation speed-D.C. voltage conversion gain considerably increases.

The D.C. amplifying transistor 54 serves to convert the change of the D.C. voltage across the capacitor 53 to a larger voltage change. When the D.C. voltage cross the capacitor 23 exceeds the base-emitter forward rising voltage of the D.C. amplifying transistor 54, the transistor 54 is turned on. On the other hand, when the D.C. voltage does not reach the rising voltage, the transistor 54 is turned off.

On the other hand, at the collector of the transistor 28 which constitutes the astable multivibrator, there appears a square wave signal having a repetition period determined by the time constant of the resistors 33 and 32 and the capacitors 34 and 35. This square wave signal is converted to a saw-tooth wave by the integration circuit comprising the resistor 36 and the capacitor 37.

This saw-tooth wave is compared by the transistor 38 with the collector output voltage of the D.C. amplifying transistor 54, that is, the voltage across the resistor 55, and an output pulse having a conduction duration which varies with the voltage across the resistor 55 appears at the collector of the transistor 38.

For example, when the voltage across the resistor 55 rises, the emitter voltage of the transistor 38 falls and a slicing level of the saw-tooth wave determined by the base potential of the transistor 38 also falls. As a result, the conduction duration of the transistor 38 increases.

The output pulse appearing at the collector of the transistor 38 is amplified by the transistor 56 and then applied to the base of the drive transistor 58.

Accordingly, the drive transistor 58 is also switched and the collector current thereof is turned on and off. However, since the switched waveform is filtered by the choke coil 43 and the capacitor 22, the current flowing in the D.C. motor 1' is switched on and off to prevent the rotation vibration of the D.C. motor 1' from increasing and the durability of brushes and commutator from being adversely affected.

The diode 44 is inserted in order to divert a reverse pulse caused by switching to thereby attain higher efficiency.

Thus, in the system shown in FIG. 16, since the driver transistor 58 for controlling the supply voltage to the D.C. motor 1' is switched, a power loss by the driver transistor is very small and the efficiency of the control circuit is improved.

Furthermore, since the output signal of the A.C. generator 2 is switched by the switching transistor 48, the switched output therefrom is filtered and the filtered output is compared with the saw-tooth wave, the rotation speed of the D.C. motor 1' is finally controlled such that the voltage across the capacitor 53 is equal to the base-emitter forward rising voltage of the D.C. amplifying transistor 54. Thus, effects caused by the change of the output frequency of the saw-tooth wave generating circuit, that is, the oscillation frequency of the astable multivibrator are eliminated and a high control gain system can be attained with a simple construction.

When the D.C. amplifying transistor 54 is omitted and the system is constructed such that the output voltage of the filter circuit is compared with the saw-tooth wave, the circuit configuration can be simplified but the control gain decreases.

While a D.C. motor speed control system is shown in the embodiment of FIG. 16, the present invention is also applicable to an A.C. motor speed control system by connecting the collector-emitter of the driver transistor through a choke coil across output terminals of a diode bridge having input terminals to which an A.C. motor is connected in series with an A.C. power supply.

Figure 17:
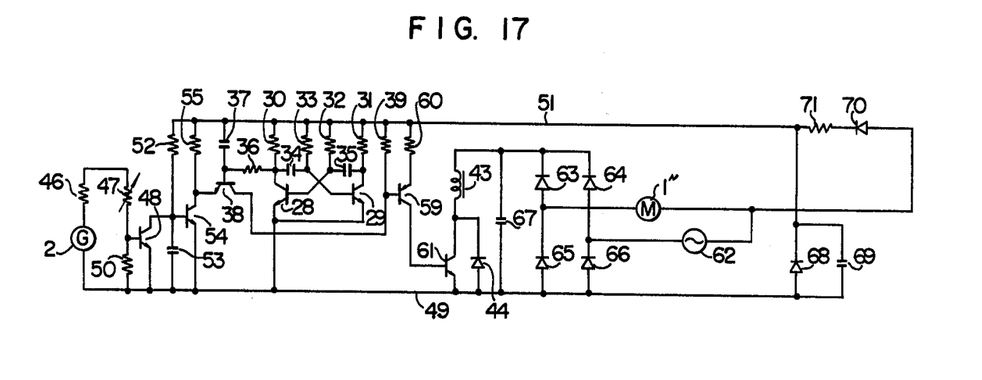

Referring to FIG. 17, the emitter of the transistor 38 is connected to the collector of the D.C. amplifying transistor 54, and the collector of the transistor 38 is connected to the positive supply line 51 through the resistor 39 and to a base of a transistor 59, an emitter of which is connected to the positive supply line 51 through a resistor 60 while a collector thereof is connected to a base of a driver transistor 61, an emitter of which is connected to the negative supply line 49.

Diodes 63, 64, 65 and 66 constitute a rectifying diode bridge having input terminals across which a series circuit of an A.C. motor 1" and an A.C. power supply 62 is connected. A negative output terminal of the diode bridge is connected to the negative supply line 49 while a positive output terminal is connected to a collector of a driver transistor 61 through a choke coil 43. A capacitor 67 is connected across the positive and negative output terminals of the diode bridge.

A diode 44 is connected between the collector and emitter of the driver transistor 61, and a zener diode 68 and a capacitor 69 are respectively connected across the positive and negative supply lines. A series circuit of a diode 70 and a resistor 71 is connected between the positive supply line 51 and the junction of the A.C. motor 1" and the A.C. power supply 62.

In FIG. 17, the resistor 46, the potentiometer 47, the switching transistor 48, the resistors 50 and 52 and the capacitor 53 constitute a speed detection circuit, the D.C. amplifying transistor 54 and the resistor 55 constitute a D.C. amplifier circuit, the transistor 38 constitutes a comparing-switching circuit, and the transistors 28 and 29, the resistors 30, 31, 32 and 33, the capacitors 34 and 35, the resistor 36 and the capacitor 37 constitute a free-running saw-tooth wave generating circuit.

The output pulse appearing at the collector of the transistor 38 is amplified and inverted by the transistor 59 and then applied to the base of the driver transistor 61.

Accordingly, the driver transistor 61 is also operated in a switching mode and the collector current of the transistor 61 is turned on and off. However, since the switched waveform is filtered by the choke coil 43 and the capacitor 67, the current flowing in the A.C. motor 1' is not discontinuous and hence the rotation vibration of the A.C. motor 1' is not increased.

Thus, in the system shown in FIG. 17, since the driver transistor 61 which controls the supply voltage to the A.C. motor 1" is operated in the switching mode, the power loss of the transistor 61 is very small and the efficiency of the control circuit is improved. Accordingly, a relatively small capacity power transistor may be used to drive a fairly large capacitance A.C. motor.

It should be understood that in the system shown in FIG. 17 the repetition period of the output signal of the free-running saw-tooth wave generating circuit should be shorter than the repetition period of the A.C. power supply 62, and it should also be shorter than a time constant of a stator winding of the A.C. motor 1" in order to minimize the electromagnetic vibration of the A.C. motor 1".

As described hereinabove, the motor speed control system of the present invention comprises the first comparator circuit and the second comparator circuit, the first comparator circuit establishing the rotation speed of the motor while the second comparator circuit producing the switching mode speed control signal. Accordingly, a high control gain can be easily attained. Furthermore, when a part of the control system becomes defective or during the start-up or overload, the control mode can be automatically changed to the continuous control mode.

I claim:
1. A motor speed control system comprising:
 a detector for detecting a rotation speed of a motor;
 a first comparator circuit for comparing an output signal of said detector with a reference signal to produce an error signal;
 a signal generating circuit for generating a saw-tooth wave having a repetition frequency;
 a second comparator circuit for comparing said error signal with said saw-tooth wave to produce a switching signal; and
 a driver circuit for driving said motor by said switching signal,
 said driver circuit including a first driver circuit for driving said motor by an output signal of said first comparator circuit and a second driver circuit for driving said motor by an output signal of said second comparator circuit, said first and second driver circuits being arranged such that said motor is normally driven by said second driver circuit, but is driven by said first driver circuit when said second driver circuit fails or during a start-up or overload condition of said motor.

2. A motor speed control system according to claim 1, wherein the base-emitter junction of a first driver transistor is connected to the output of said first comparator circuit through a voltage drop element, and a base-emitter junction of a first stage transistor forming said second driver circuit is connected to the output of said first comparator circuit, said second comparator circuit comparing the output signal of said first stage transistor with said saw-tooth wave, and a second driver transistor is connected to the output of said second comparator circuit.

* * * * *